US012736069B2

(12) United States Patent
Chu et al.

(10) Patent No.: US 12,736,069 B2
(45) Date of Patent: Sep. 15, 2026

(54) MULTI-CHANNEL FLOW CONTROL SYSTEM

(71) Applicant: Industrial Technology Research Institute, Hsinchu (TW)

(72) Inventors: Cheng-Yu Chu, Chiayi City (TW); Shang-Te Chen, Taichung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 19/050,454

(22) Filed: Feb. 11, 2025

(65) Prior Publication Data

US 2026/0160277 A1 Jun. 11, 2026

(30) Foreign Application Priority Data

Dec. 11, 2024 (TW) ................................ 113148192

(51) Int. Cl.

| | |
|---|---|
| ***F15B 13/04*** | (2006.01) |
| *B63H 21/38* | (2006.01) |
| *F15B 9/08* | (2006.01) |
| *F15B 9/09* | (2006.01) |
| *F15B 13/044* | (2006.01) |
| *F15B 13/08* | (2006.01) |

(52) U.S. Cl.

CPC ........ *F15B 13/0401* (2013.01); *B63H 21/386* (2013.01); *F15B 9/08* (2013.01); *F15B 9/09* (2013.01); *F15B 2013/0409* (2013.01); *F15B 2013/041* (2013.01); *F15B 2013/0412* (2013.01); *F15B 2013/0413* (2013.01); *F15B 13/044* (2013.01); *F15B 13/0889* (2013.01)

(58) Field of Classification Search

CPC .......................... F15B 13/0401; F15B 13/044; F15B 13/0889; F15B 2013/0409; F15B 2013/041; F15B 2013/0412; F15B 2013/0413; F15B 9/08; F15B 9/09; B63H 21/386

USPC .......................................................... 137/597

See application file for complete search history.

(56) References Cited

U.S. PATENT DOCUMENTS

| | | | | | |
|---|---|---|---|---|---|
| 1,866,280 | A * | 7/1932 | Woolson | F01M 11/065 | 184/6.2 |
| 2,022,898 | A * | 12/1935 | Niven | F16N 9/04 | 184/6.2 |

(Continued)

FOREIGN PATENT DOCUMENTS

| | | |
|---|---|---|
| CN | 201040345 Y | 3/2008 |
| CN | 102486208 A | 6/2012 |

(Continued)

OTHER PUBLICATIONS

TW OA issued on Oct. 13, 2025.
DE OA issued on Nov. 14, 2025.
JP OA issued on Apr. 21, 2026.

*Primary Examiner* — Minh Q Le
(74) *Attorney, Agent, or Firm* — WPAT, PC

(57) ABSTRACT

The present disclosure generally relates to a multi-channel flow control system, more particularly to an oil return control, such as a multi-channel flow control system, that is suitable for hydrostatic rotary mechanisms, and it prevents the oil pump from being damaged due to dry pumping and ensures that the oil storage space does not overflow due to excessive accumulation of hydraulic oil.

13 Claims, 14 Drawing Sheets

(56) References Cited

U.S. PATENT DOCUMENTS

| | | | | | |
|---|---|---|---|---|---|
| 3,719,352 | A * | 3/1973 | Harrison et al. | F02M 5/02 | 261/DIG. 50 |
| 4,023,548 | A * | 5/1977 | Prasch | F01M 11/065 | 123/196 CP |
| 4,103,665 | A * | 8/1978 | Prasch | F01M 11/065 | 123/196 R |
| 5,106,120 | A * | 4/1992 | Di Maria | B60G 21/0555 | 137/625.23 |
| 6,260,534 | B1 * | 7/2001 | Kampichler | F01M 11/03 | 123/196 R |
| 6,478,646 | B1 * | 11/2002 | Fukuoka | B63H 23/08 | 440/88 L |
| 2008/0199111 | A1 | 8/2008 | Rudy | | |
| 2011/0056452 | A1 * | 3/2011 | Horner | F01M 11/064 | 222/3 |
| 2016/0243555 | A1 * | 8/2016 | Matsumoto | B02C 15/04 | |
| 2021/0277812 | A1 * | 9/2021 | Smith | F01M 11/02 | |
| 2022/0018455 | A1 * | 1/2022 | Popovic | B25J 9/0006 | |
| 2022/0390156 | A1 * | 12/2022 | Groll | F25B 49/02 | |
| 2023/0406472 | A1 | 12/2023 | Long et al. | | |
| 2025/0137470 | A1 * | 5/2025 | Iotti | F15B 11/0445 | |

FOREIGN PATENT DOCUMENTS

| | | | |
|---|---|---|---|
| CN | 207239696 | U | 4/2018 |
| CN | 108818010 | A | 11/2018 |
| CN | 116255398 | A | 6/2023 |
| DE | 102021104766 | A1 | 9/2021 |
| JP | H1113760 | A | 1/1999 |
| JP | 2004084633 | A | 3/2004 |
| TW | 201006604 | A | 2/2010 |
| TW | M409121 | U | 8/2011 |
| TW | M417221 | U | 12/2011 |
| TW | M442217 | U | 12/2012 |
| TW | I478789 | B | 4/2015 |
| TW | M518125 | U | 3/2016 |
| TW | I560019 | B | 12/2016 |
| TW | I589791 | B | 7/2017 |
| TW | I593505 | B | 8/2017 |
| TW | I597436 | B | 9/2017 |
| TW | I612232 | B | 1/2018 |
| TW | 202302266 | A | 1/2023 |
| TW | 202317878 | A | 5/2023 |
| WO | WO 98/25039 | A1 | 6/1998 |

* cited by examiner

MULTI-CHANNEL FLOW CONTROL SYSTEM

CROSS REFERENCE TO RELATED APPLICATION

This application claims the benefits of Taiwan application Serial No. 113148192, filed on Dec. 11, 2024, the disclosures of which are incorporated by references herein in its entirety.

TECHNICAL FIELD

The present disclosure generally relates to a multi-channel flow control system, more particularly to an oil return control, such as a multi-channel flow control system, that is suitable for hydrostatic rotary mechanisms, and it prevents the oil pump from being damaged due to dry pumping and ensures that the oil storage space does not overflow due to excessive accumulation of hydraulic oil.

BACKGROUND

A hydrostatic rotary mechanism, such as a two-axis hydrostatic rotary worktable for carrying workpieces or a two-axis hydrostatic spindle head for holding tools, uses hydraulic oil as the working fluid to achieve the effect of a non-contact bearing (extremely low friction, vibration damping, and exceptionally long product lifespan).

The hydraulic oil is continuously pumped into a hydrostatic bearing with a constant pressure, in order to achieve the effect of support, and flows out to accumulate in an oil storage space (ex. oil-containing tray). Thereafter, it returns back to the oil tank of a hydraulic system through oil return channels.

Under the condition of the flow amount of the hydraulic oil being able to be estimated, a single-axis hydrostatic rotary mechanism is only configured with an oil return channel, and the oil return channel connects with an oil-containing tray. Such design helps that the hydraulic oil is draw back to the oil tank by pump.

As for the two-axis hydrostatic rotary mechanism, the hydraulic oil in the oil storage space accumulates in different positions due to gravity as the tilt angle of the worktable changes. If only one oil return channel is configured, at certain worktable tilt angles, when the oil extraction point differs from the accumulation position of the hydraulic oil, it may take several minutes for the oil level to rise to the height of the oil extraction point. During this time, the oil level might exceed the seams of the worktable, causing the hydraulic oil to seep out from the seams.

In addition, if there are plural oil return channels, and the opening and closing of the channels are not controlled. The resistance to extracting the hydraulic oil is greater than that of extracting air. That is, the pump may intend to extract air rather than hydraulic oil. This can easily damage the pump, and the purpose to draw the hydraulic oil back to the oil tank of the hydraulic system cannot be achieved.

As for the two-axis hydrostatic rotary worktable that carries the workpiece, in order to solve the problem of recycling the hydraulic oil from the hydrostatic rotary worktable, people in the art have implemented the following prior arts.

The flow rate of the adjustable throttle: It is manually adjusted by on-site personnel based on the geometric accuracy measurement results. Therefore, the return oil flow rate cannot be predetermined and must rely on natural oil return, and the gravity can be used to guide the hydraulic oil in the oil storage structure back to the oil tank.

Forced oil return using a pump for extraction: Since the flow rate of the pump can carry per revolution is fixed, and so does the speed of the pump motor. Once the pump, the pump motor, and the power supply conditions are determined, the extraction capacity of the forced oil return is a constant value.

Hydrostatic rotary worktable with an adjustable throttle: Since the return oil flow rate cannot be predetermined, only natural oil return can be used. If cooperated with forced oil return, it is very easy to mismatch the oil return flow and extraction capacity. When the extraction capacity is insufficient, the hydraulic oil in the oil storage structure may continuously accumulate until it overflows from the seams at the rotating part. When the pumping capacity is too large, the pump will continue to pump out a large amount of air. After a certain period of time, the pump motor will be damaged due to empty pumping.

One-axis hydrostatic rotary worktable using natural oil return: In its piping layout, the oil storage structure must be at the highest point, otherwise the oil return will not be smooth. This happens many restrictions as well on the table height design and piping layout of the whole equipment using this module.

In view of structure, the hydrostatic rotary worktable using natural oil return cannot construct the two-axis rotary worktable. Since the hydraulic oil accumulated on the oil storage structure cannot flow back to the oil tank via the gravity, the oil return channel with extraction power shall be a must. So that the hydraulic oil can return to the oil tank from the lower oil storage structure through other motor pumps and piping routes.

Similarly, the two-axis hydrostatic spindle head used to clamp the tool also has the same problem of recycling hydraulic oil.

Based on this, developing an oil return control, such as a multi-channel flow control system, that is suitable for hydrostatic rotary mechanisms, and it prevents the oil pump from being damaged due to dry pumping and ensures that the oil storage space does not overflow due to excessive accumulation of hydraulic oil, is a challenge that people in the art urgently need to solve.

SUMMARY

In one embodiment, the present disclosure provides a multi-channel flow control system, which is applied to a hydrostatic rotary mechanism, and has an oil storage space (12) for holding hydraulic oil, the oil storage space has a first side and a second side that are opposite to each other, the first side and the second side have at least one oil outlet hole respectively, the hydrostatic rotary mechanism is able to swing according to a first rotary shaft as a rotary center, a level height of each oil outlet hole at the first side and a level height of each oil outlet hole at the second side are raised and lowered together with the oil storage space that is driven by the hydrostatic rotary mechanism, the multi-channel flow control system comprises:

- an angle sensing module, which has at least one sensor, a part of components or total components of the angle sensing module and the hydrostatic rotary mechanism rotate simultaneously, in order to trigger off at least one of the sensors for generating a sensing signal; a signal processing module, which electrically connects with the angle sensing module, and receives the sensing signals to generate a control signal; and a flow control module, which has a plurality of pipelines that connect with the oil outlet holes and an oil return pipeline respectively, each pipeline is disposed a valve individually, each of the valves electrically connects with the signal processing module, the control signal controls a switching degree of at least one of the valves, in order to control an amount of the hydraulic oil flowing into the oil return pipeline from the oil storage space via at least one of the oil outlet holes.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
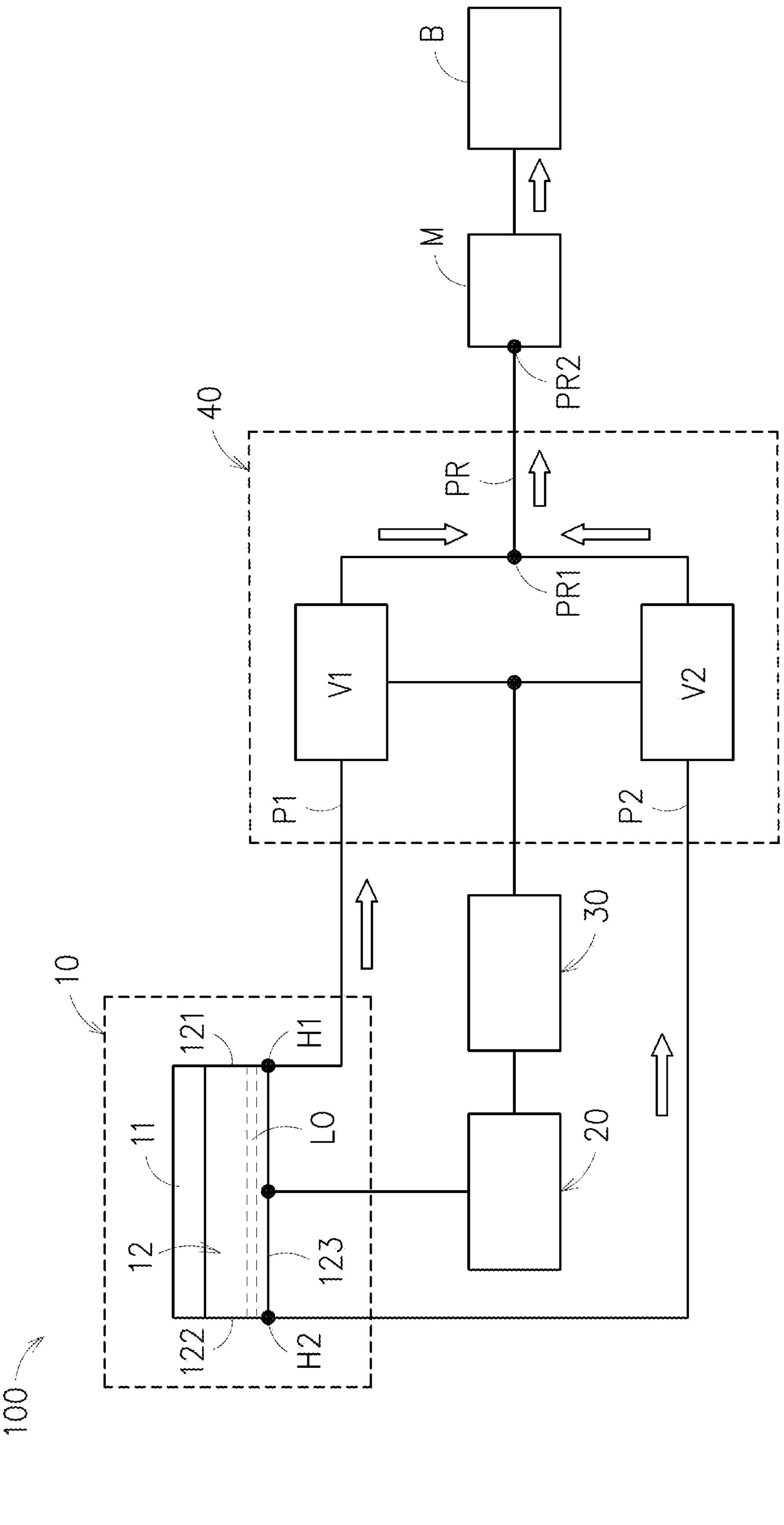
FIG. 1 illustrates a schematic structural view of an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terms “including”, “comprising”, “having” and the like mentioned in this disclosure are all open terms; i.e., implying only “including but not limited to”.

In the description of embodiments, when terms such as “first”, “second”, “third”, “fourth” etc. are used to describe elements, they are only used to distinguish these elements from each other, but not limit order or importance of any of these elements.

In the descriptions of various embodiments, the so-called “coupling” or “connection” may refer to two or a plurality of components making physical or electrical contact directly or indirectly with each other, or refer to the mutual operation or action of two or a plurality of elements.

Please refer to FIG. 1. A multi-channel flow control system 100 provided by the present disclosure is applied to a hydrostatic rotary mechanism 10, and has an angle sensing module 20, a signal processing module 30, and a flow control module 40. For another embodiment, the multi-channel flow control system 100 further has the hydrostatic rotary mechanism 10.

With reference to FIG. 1, the hydrostatic rotary mechanism 10 has an oil storage space 12 for storing hydraulic oil LO.

the hydrostatic rotary mechanism 10 is, for example, the worktable of a two-axis hydrostatic rotary machine tool or the spindle head of a two-axis hydrostatic system, but not limited thereto. The worktable of a two-axis hydrostatic rotary machine tool can be replaced by the spindle of a holding tool, it becomes the spindle head of the two-axis hydrostatic rotary machine tool. On the contrary, the spindle of the holding tool is instead of the worktable, it becomes the two-axis hydrostatic rotary machine tool.

Figure 2:
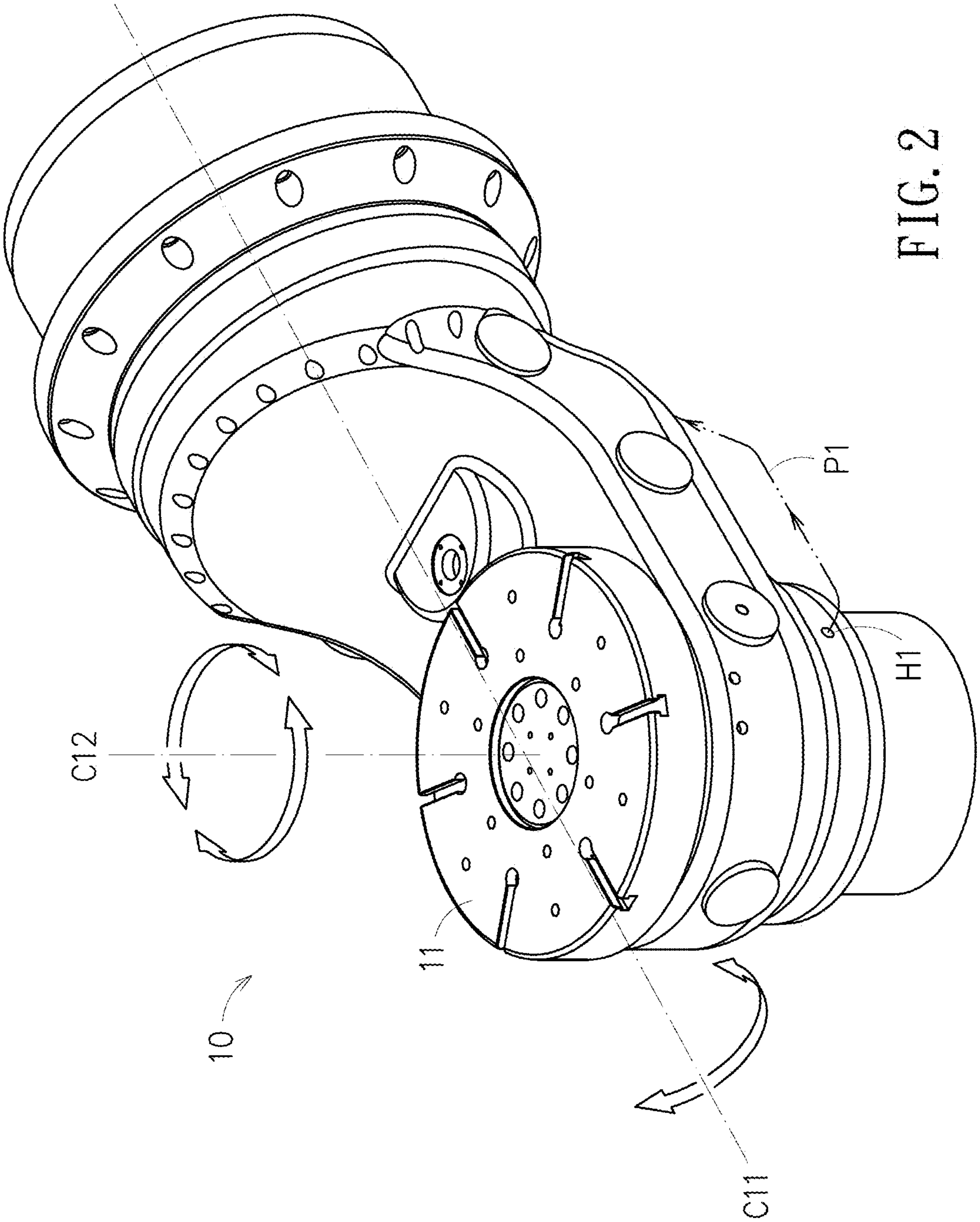
FIG. 2 illustrates a schematic 3-D structural view of a hydrostatic rotary mechanism applied by the present disclosure.
Figure 3:
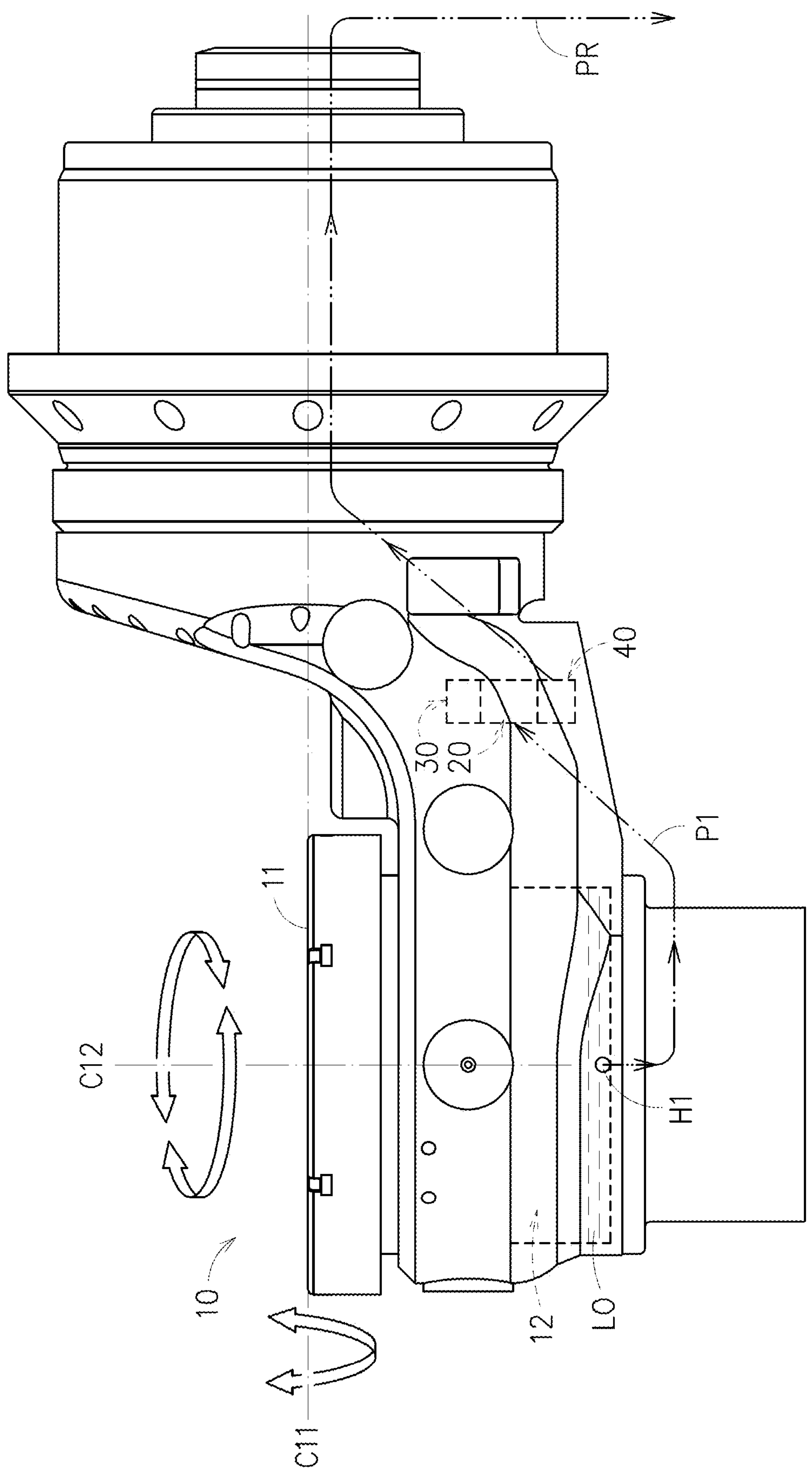
FIG. 3 illustrates a schematic lateral structural view of the hydrostatic rotary mechanism of FIG. 2.
Figure 4:
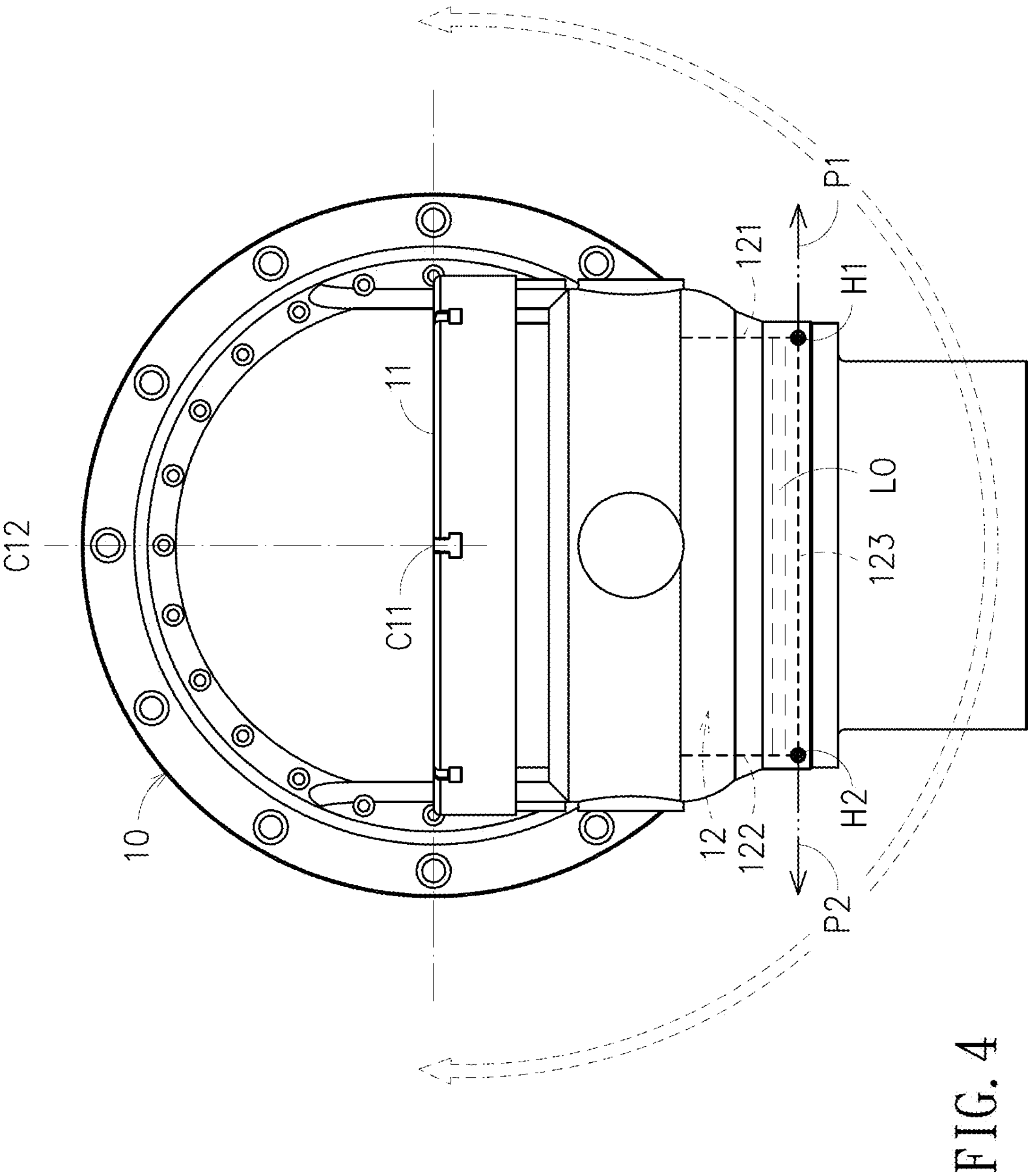
FIG. 4 illustrates a schematic front structural view of the hydrostatic rotary mechanism of FIG. 2.

Regarding FIG. 2 to FIG. 4, which illustrate an embodiment of the hydrostatic rotary mechanism 10 using a two-axis hydrostatic rotary machine tool. The hydrostatic rotary mechanism 10 has a worktable 11. Usually, the oil storage space 12 is disposed at the bottom portion of the worktable 11.

The worktable 11 and the oil storage space 12 are able to swing simultaneously according to a first rotary shaft C11 as a rotary center. Besides, the worktable 11 rotates and takes a second rotary shaft C12 as a rotary center.

With regard to FIG. 1 and FIG. 4, the oil storage space 12 has a first side 121 and a second side 122. A third side 123 is disposed between the two bottom edges of the first side 121 and the second side 122, in order to let the oil storage space 12 be formed by a basin shape with an open top. The hydraulic oil LO in the worktable 11 flows into the oil storage space 12 from the open top of the oil storage space 12. The adjacent place of the first side 121 and the second side is disposed a first oil outlet hole H1, and the adjacent place of the second side 122 and third side 123 is disposed a second oil outlet hole H2.

The first oil outlet hole H1 and the second oil outlet hole H2 can be arranged symmetrically or asymmetrically. The embodiments illustrated in FIG. 1 and FIG. 4 are symmetrical arrangements.

When the worktable 11 and the oil storage space 12 synchronize oscillation and take the first rotary shaft C11, the level heights of the first oil outlet hole H1 and the second oil outlet hole H2 are raised and lowered correspondingly.

Figure 5:
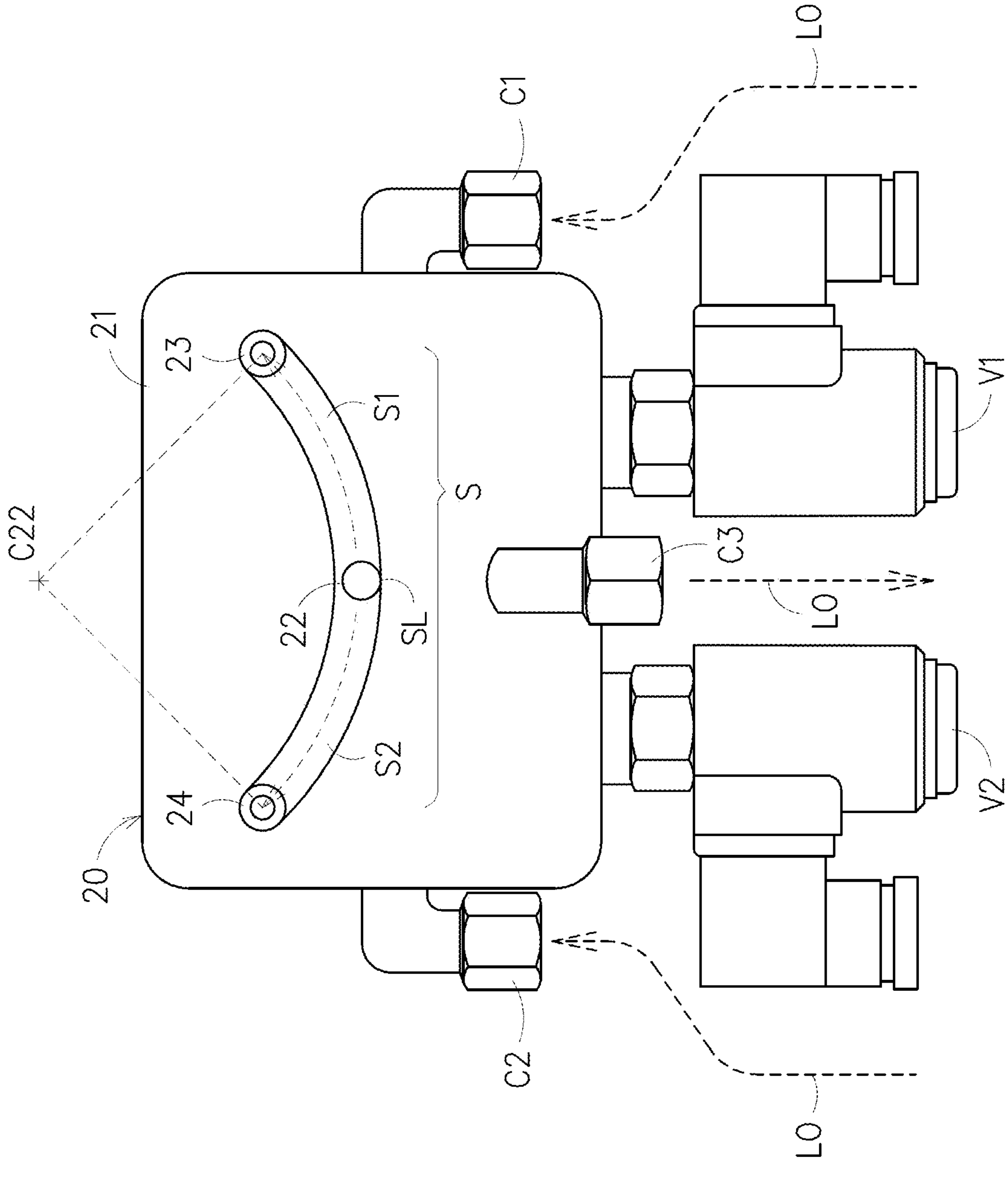
FIG. 5 illustrates a schematic structural view of an embodiment of an angle sensing module integrated with valves of the present disclosure.

In regard to FIG. 1, FIG. 3 and FIG. 5, the angle sensing module 20 and the hydrostatic rotary mechanism 10 are connected with each other, and swing simultaneously as well. The angle sensing module 20 is used to sense the oscillation angle of the hydrostatic rotary mechanism 10 and then generates a sensing signal.

The position for the angle sensing module 20 depends on realistic need. It can be disposed in the hydrostatic rotary mechanism 10 (as shown in FIG. 3), or outside of the hydrostatic rotary mechanism 10. The angle sensing module 20 is not necessarily installed in the center of the hydrostatic rotary mechanism 10. In principle, some or all components of the angle sensing module 20 are able to swing together with the angle sensing mechanism 10.

According to FIG. 5, which illustrates an integrated structure of the angle sensing module 20 and the flow control module 40.

The angle sensing module 20 has a body 21, a sliding component 22, a first sensor 23, and a second sensor 24.

The body 21 has a chute S. The chute S is with a lower point SL, and the two comparative sides of the lower point SL are a first portion S1 and a second portion S2 of the chute S.

As shown in FIG. 5, the chute S is formed by one arc segment. The first portion S1 and the second portion S2 are symmetrically disposed on the two opposite sides of the low point SL, extending outward and upward as an arc.

The sliding component 22 is disposed in the chute S, and is located on the lower point SL of the chute S if the body 21 does not swing. When the hydrostatic rotary mechanism 10 drives the body 21 to swing, the sliding component 22 is able to move right and left in the chute S.

The sliding component 22 is, for example, a ball, a roller, or an object with a regular or irregular geometric shape characteristic of a rotary shaft. For instance, if the sliding component 22 is a roller, the rotary shaft C22 of the sliding component 22 is parallel to the first rotary shaft C11 when the sliding component 22 moves in the chute S.

In relation to FIG. 5, the first sensor 23 and the second sensor 24 are disposed at two opposite ends of the first portion S1 and the second portion S2 of the chute S. The two level heights of the first sensor 23 and the second sensor 24 are higher than the level height of the lower point SL. The two level heights of the first sensor 23 and the second sensor 24 are raised and lowered alternatively followed by that the body 21 is oscillating.

For the embodiment of FIG. 5, the level heights of the first sensor 23 and the second sensor 24 are equally high, and they can be designed by realistic needs, but not limited thereto.

The first sensor 23 and the second sensor 24 can be one of a proximity switch, a photoelectric switch, a microswitch, and a wire.

The angle sensing module 20 can be composed of an optical scale or a magnetic scale.

Please refer to FIG. 1, the signal processing module 30 electrically connects with the angle sensing module 20, and receives sensing signals from the angle sensing module 20 to generate a control signal.

The signal processing module 30 can be an embedded system, a microsystem, or a standard port, which connects with an external computer numerical controller (CNC), a numerical control (NC) machine tool, a personal computer (PC), or a programmable logic controller (PLC).

With reference to FIG. 1, the flow control module 40 electrically connects with the signal processing module 30, and has a first pipeline P1, a second pipeline P2, a first valve V1, a second valve V2, and an oil return pipeline PR.

The oil return pipeline PR has an oil inlet end PR1 and an oil outlet end PR2. The oil outlet end PR2 of the oil return pipeline PR connects with a motor pump M and an oil tank B.

The two comparative ends of the first pipeline (P1) connects with the first oil outlet hole H1 and the oil inlet end PR1 of the oil storage space 12 respectively, and the two comparative ends of the second pipeline P2 connects with the second oil outlet hole H2 and the oil inlet end PR1 of the oil storage space 12 individually.

The first valve V1 is disposed at the first pipeline P1, and the second valve V2 is disposed at the second pipeline P2. The first valve V1 and the second valve V2 can, for example, be either a solenoid valve or a flow control valve. The first valve V1 and the second valve V2 control the amount of the hydraulic oil LO in the first pipeline P1 and/or the second pipeline P2 flowing into the oil return pipeline PR.

When the first valve V1 and the second valve V2 are in an open state, as shown by the path of the hollow arrow in FIG. 1, the hydraulic oil LO is able to flow into the first pipeline P1 through the first oil outlet hole H1 and the second pipeline P2 through the second oil outlet hole H2 simultaneously. Thereafter, the hydraulic oil LO flows into the motor pump M, and is pumped into the oil tank B. This disclosed embodiment only explains how to control the hydraulic oil LO to flow back from the oil storage space 12 to the oil tank B at the appropriate time. It does not include how the hydraulic oil LO flows from the oil tank (B) to the oil storage space 12.

In accordance with FIG. 1 and FIG. 5, as the embodiment in FIG. 5, the first valve V1 and the second valve V2 are disposed at the bottom portion of the body 21. The two opposite sides of the body 21 are disposed two connectors C1, C2 that connect with the first pipeline P1 and the second pipeline P2. A connector C3 connecting with the oil return pipeline PR is installed beneath the chute S of the body 21. Based on this, an integrated structure of the angle sensing module 20 and the flow control module 40 is provided. It is to be understood for people skilled in the art that, the first pipeline P1, the second pipeline P2 and the oil return pipeline PR connect with each other in the body 21 via the connectors C1, C2, C3. The first valve V1 and the second valve V2 control the first pipeline P1 and the second pipeline P2 respectively in the body 21.

With reference to FIG. 1, which explains the working principle of the multi-channel flow control system 100 of the present disclosure. When the hydrostatic rotary mechanism 10 is oscillating, the angle sensing module 20 senses the oscillation angle of the hydrostatic rotary mechanism 10 and generates sensing signals. The signal processing module 30 receives the sensing signals, and then provides control signals to the switching degrees of the first valve V1 and/or the second valve V2, in order to control the amount of the hydraulic oil LO flowing from the oil storage space 12 to the first pipeline P1 and/or the second pipeline P2 via the first oil outlet hole H1 and/or the second oil outlet hole H2, and thus to the oil return pipeline PR.

Figure 6B:
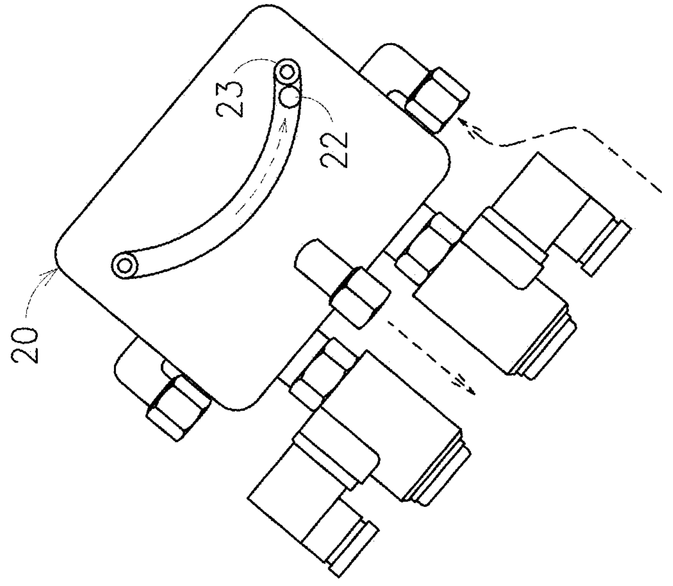
FIG. 6A and FIG. 6B illustrate schematic structural views of the hydrostatic rotary mechanism oscillating to make a sliding component enter into a sensing range of a first sensor of the present disclosure.
Figure 6A:
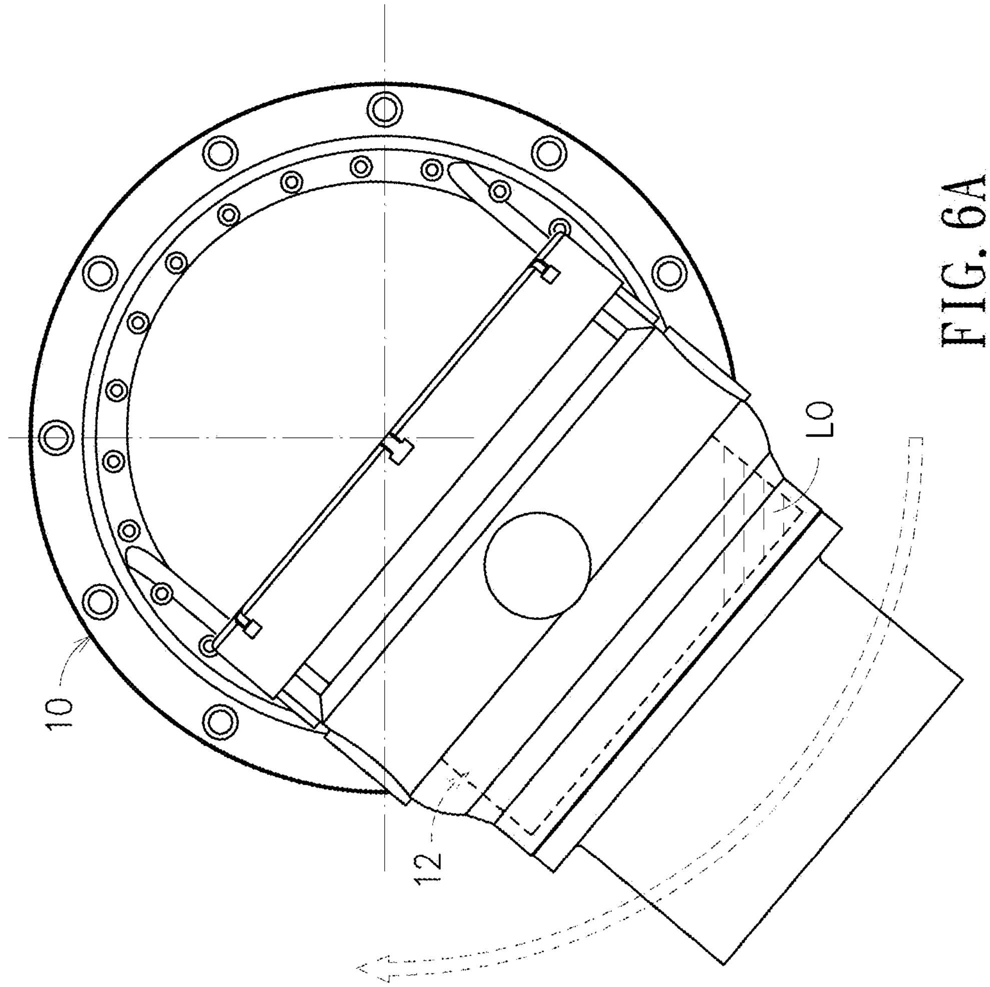
Figure 7:
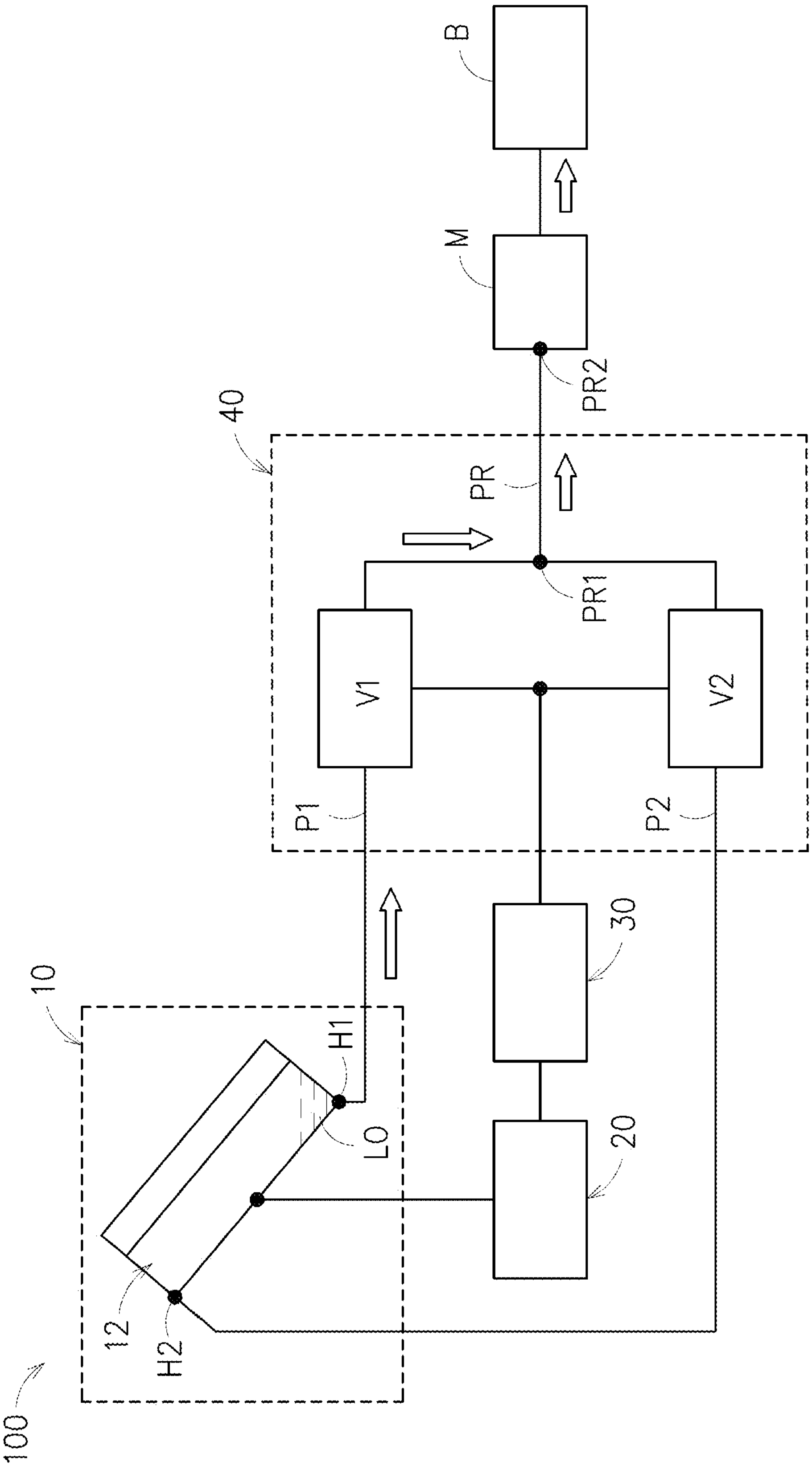
FIG. 7 illustrates a structural view of a signal processing module controlling to close a second valve when the sliding component enters into the sensing range of the first sensor of the present disclosure.

Please refer to FIG. 6A, FIG. 6B and FIG. 7, the hydrostatic rotary mechanism 10 and the angle sensing module 20 swing simultaneously. When the hydrostatic rotary mechanism 10 swings toward the left side, and the sliding component 22 goes into the sensing range of the first sensor 23, the first sensor 23 generates a sensing signal and transmits the sensing signal to the signal processing module 30. Due to the tilt of the oil storage space 12, the hydraulic oil LO concentrates on the right side of the oil storage space 12.

The signal processing module 30 receives the sensing signal and produces a control signal, so as to control the switching degrees of the first valve V1 and/or the second valve V2. If the second valve V2 is fully closed, it can block the hydraulic oil LO flowing into the second pipeline P2 from the second outlet hole H2. As shown the empty arrow in FIG. 7, the hydraulic oil LO only flows into the first pipeline P1 and then the oil return pipeline PR through the first oil outlet hole H1, continuously the motor pump M pumps the hydraulic oil LO into the oil tank B. Such that, it prevents that the motor pump M pumps the air in the second pipeline P2.

Figure 8B:
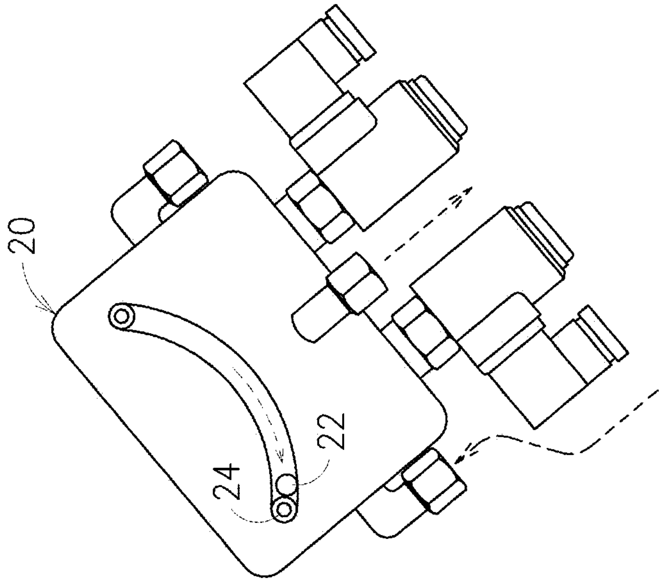
FIG. 8A and FIG. 8B illustrate schematic structural views of the hydrostatic rotary mechanism oscillating to make the sliding component enter into a sensing range of a second sensor of the present disclosure.
Figure 8A:
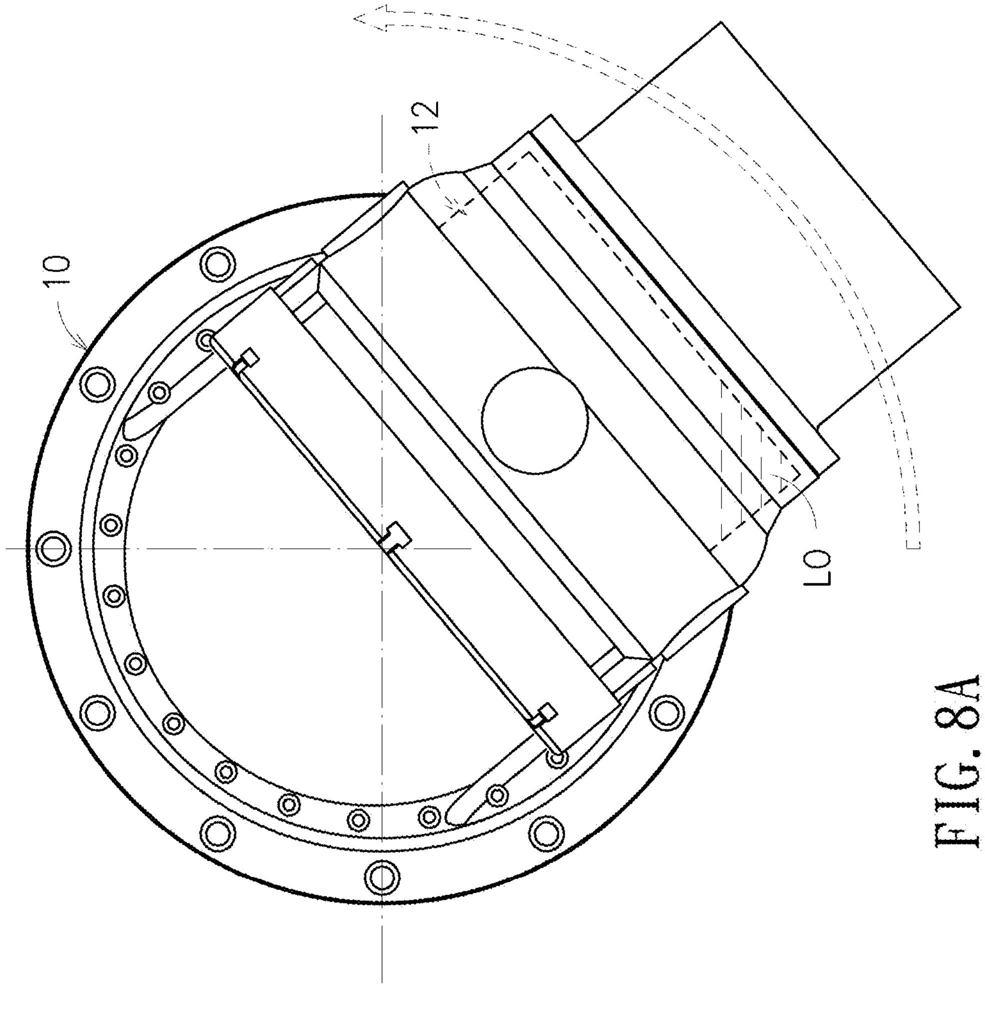
Figure 9:
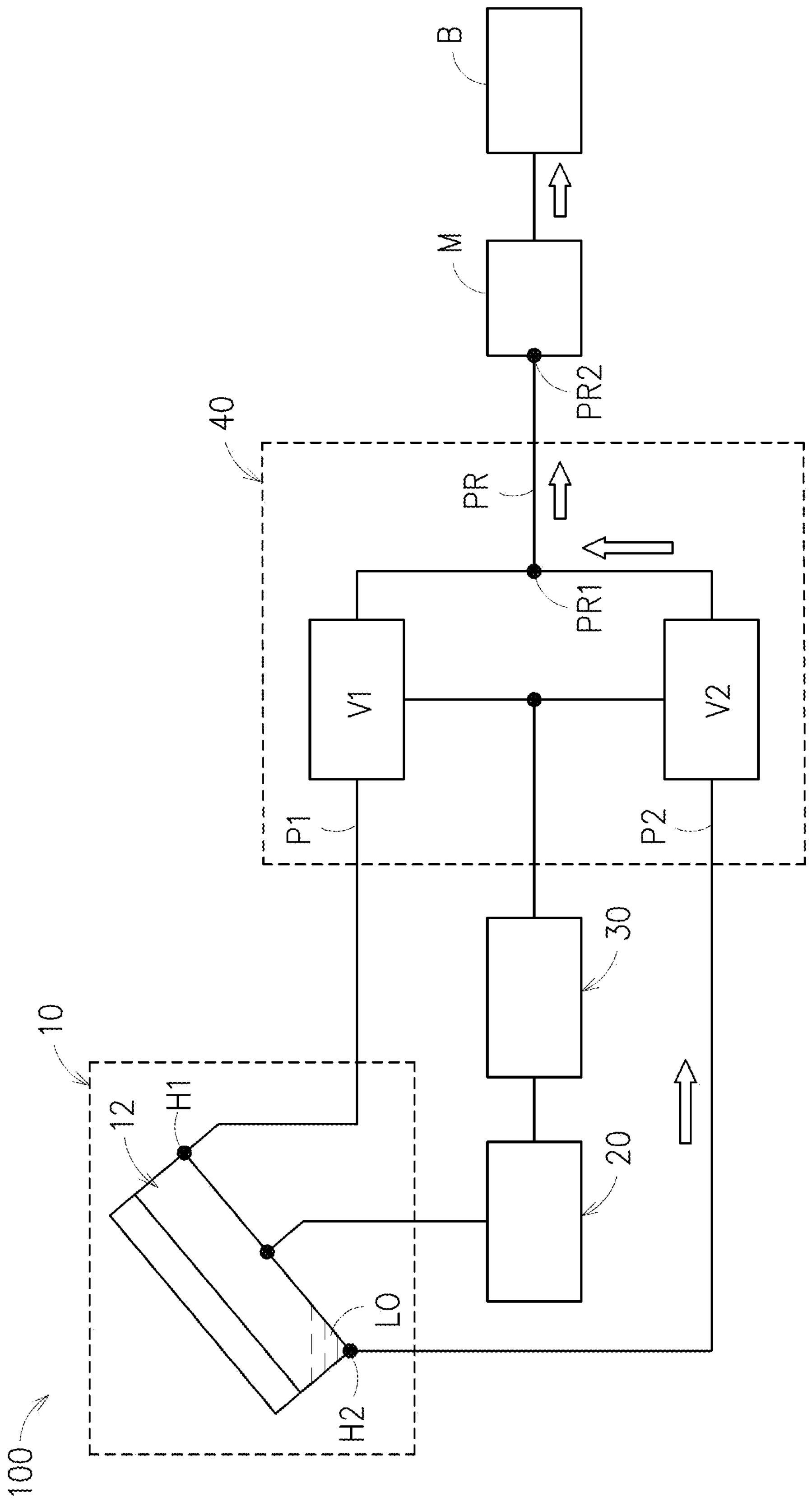
FIG. 9 illustrates a structural view of the signal processing module controlling to close a first valve when the sliding component enters into the sensing range of the second sensor of the present disclosure.

In regard to FIG. 8A, FIG. 8B and FIG. 9, the hydrostatic rotary mechanism 10 and the angle sensing module 20 swing synchronously. When the hydrostatic rotary mechanism 10 swings toward the right side, and the sliding component 22 goes into the sensing range of the second sensor 24, the second sensor 24 generates a sensing signal and transmits the sensing signal to the signal processing module 30. Due to the tilt of the oil storage space 12, the hydraulic oil LO concentrates on the left side of the oil storage space 12.

The signal processing module 30 receives the sensing signal and produces a control signal, so as to control the switching degrees of the first valve V1 and/or the second valve V2. If the first valve V1 is fully closed, it can block the hydraulic oil LO flowing into the first pipeline P1 from the first outlet hole H1. As shown the empty arrow in FIG. 9, the hydraulic oil LO only flows into the second pipeline P2 and then the oil return pipeline PR through the second oil outlet hole H2, continuously the motor pump M pumps the hydraulic oil LO into the oil tank B. Such that, it prevents that the motor pump M pumps the air in the first pipeline P1.

As shown from FIG. 10A to FIG. 10E, the chute S installed in the body 21 can be a plurality of embodiments, but they are not limited thereto.

Figure 10A:
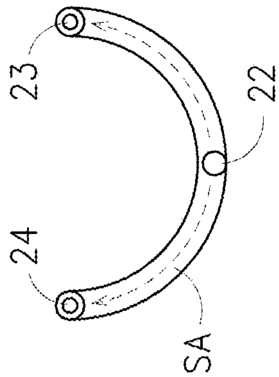
FIG. 10A to FIG. 10E illustrate schematic structural views of different embodiments of a chute of the present disclosure.

A chute SA in FIG. 10A is formed by an arc segment with a semicircular arc. The first sensor 23 and the second sensor 24 are disposed at the two opposite ends of the chute SA respectively. Compared to FIG. 5, the chute SA shown in FIG. 10A and the chute S shown in FIG. 5 are both arc-shaped, but their curvatures are different.

Figure 10B:
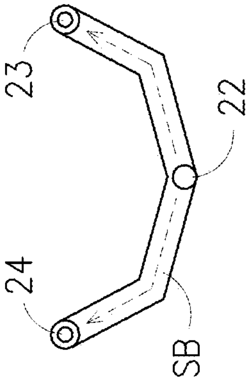

A chute SB in FIG. 10B is composed of a plurality of linear segments. The first sensor 23 and the second sensor 24 are installed at the two opposite ends of the chute SB individually.

Figure 10C:
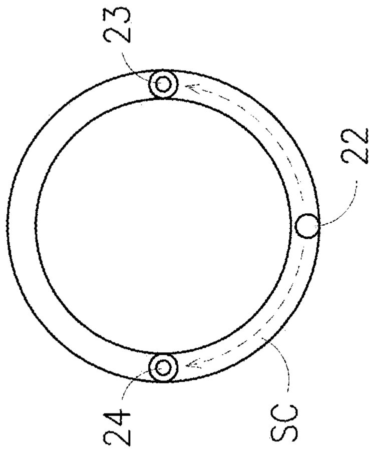

A chute SC in FIG. 10C is composed of an arc segment with a circle. The first sensor 23 and the second sensor 24 are located at the two opposite sides of the chute SC.

Figure 10D:
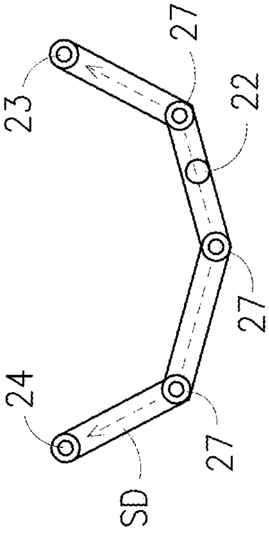

A chute SD in FIG. 10D is formed by a plurality of linear segments with three turning points. The first sensor 23 and the second sensor 24 are disposed at the two opposite ends of the chute SD, and each of the turning points is with a turning sensor 27.

Figure 10E:
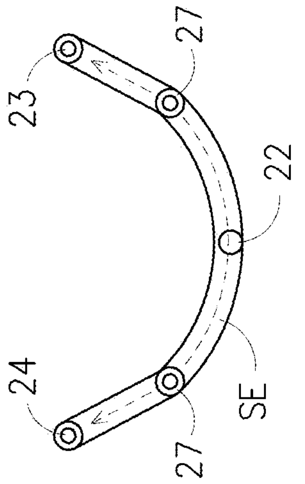

The chute SE in FIG. 10E is composed of an arc segment and two linear segments with two turning points. The first sensor 23 and the second sensor 24 are disposed at the two opposite ends of the chute SE, and each of the turning points is with a turning sensor 27.

Although the chutes SA-SE shown from FIG. 10A to FIG. 10E are different from the chute S in FIG. 5, the working principle of the sliding component 22 is the same. When the sliding member 22 reciprocates within the chutes SC, SD, and it enters the sensing range of the first sensor 23, the second sensor 24 or the turning sensor 27 respectively, different sensing signals may be generated individually. Thereafter, according to FIG. 1, the signal processing module 30 may produce different control signals depending on different sensing signals, in order to control the switching degrees of the first valve V1 and/or the second valve V2. The pipelines controlled by the turning sensor 27 will be designed by realistic needs, and they are probably the first pipeline P1 and/or the second pipeline P2.

Figure 11:
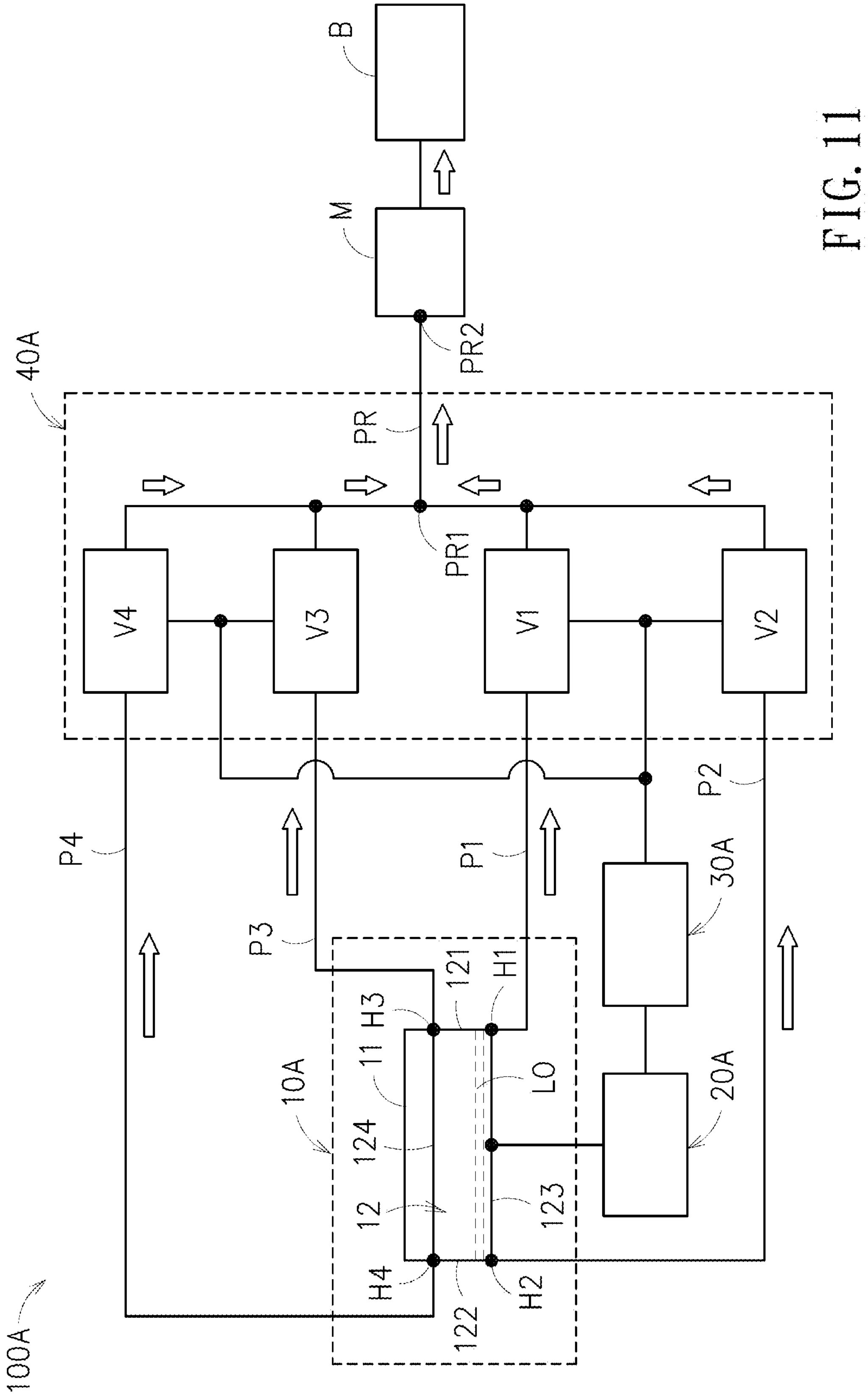
FIG. 11 illustrates a schematic structural view of another embodiment of the present disclosure.

Another embodiment illustrated in FIG. 11, a multichannel flow control system 100A provided by the present disclosure has a hydrostatic rotary mechanism 10A, an angle sensing module 20A, a signal processing module 30A, and a flow control module 40A.

Compared to FIG. 1, an oil storage space 12A of the embodiment in FIG. 11 has two opposite sides, which are a first side 121 and a second side 122. Two opposite sides, a third side 123 and a fourth side 124, are perpendicular to the horizontal level and between the first side 121 and the second side 122. The third side 123 is disposed at the two bottom edges of the first side 121 and the second side 122. Comparatively, the fourth side 124 is located at and between the two top edges of the first side 121 and the second side 122.

The adjacent place of the first side 121 and the third side 123 is disposed a first oil outlet hole H1. The adjacent place of the second side 122 and the third side 123 is disposed a second oil outlet hole H2. The adjacent place of the first side 121 and the fourth side 124 is disposed a third oil outlet hole H3. The adjacent place of the second side 122 and the fourth side 124 is disposed a fourth oil outlet hole H4.

The level heights of the first oil outlet hole H1, the second oil outlet hole H2, the third oil outlet hole H3, and the fourth oil outlet hole H4 are raised and lowered together with that when the hydrostatic rotary mechanism 10A swings and drives the oil storage space 12A to swing synchronously.

The first oil outlet hole H1, the second oil outlet hole H2, the third oil outlet hole H3, and the fourth oil outlet hole H4 can be arranged symmetrically or asymmetrically. The embodiment illustrated in FIG. 11 is a symmetrical arrangement.

Figure 12:
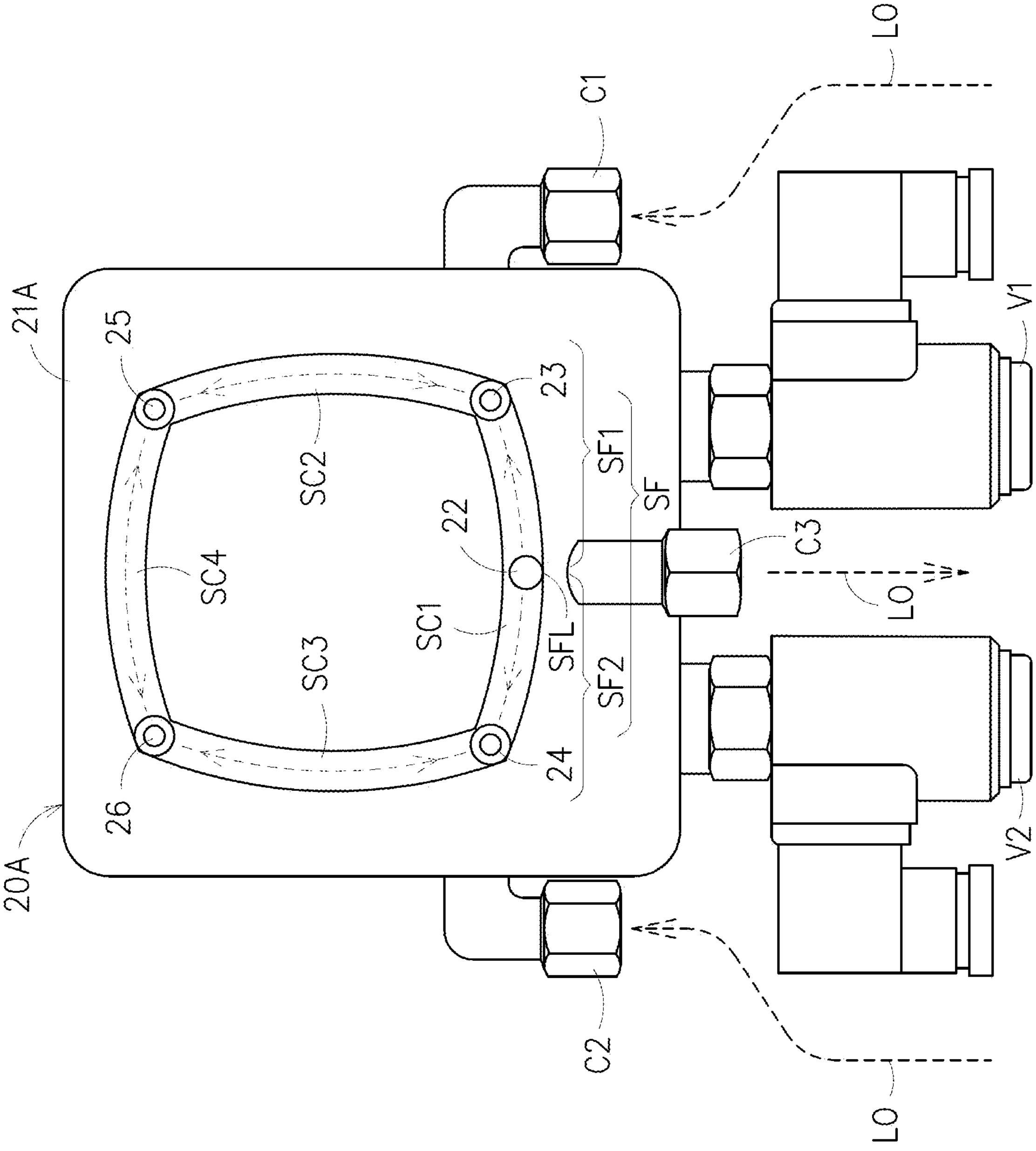
FIG. 12 illustrates a schematic structural view of another embodiment of the angle sensing module integrated with valves of the present disclosure.

An angle sensing module 20A illustrated in FIG. 12 has a body 21A, a sliding component 22, a first sensor 23, a second sensor 24, a third sensor 25, and a fourth sensor 26.

A chute SF is formed by four arc-shaped sections, SC1 to SC4, forming a rectangle with four turning points. The four turning points are disposed the first sensor 23, the second sensor 24, the third sensor 25, and the fourth sensor 26. An arc segment SC1 has a lower point SFL. According to the lower point SFL, which two opposite sides are a first portion SF1 and a second portion SF2 of the chute SF.

The level heights of the first sensor 23, the second sensor 24, the third sensor 25, and the fourth sensor 26 are higher than the level height of the lower point SFL.

For the embodiment in FIG. 12, the level heights of the first sensor 23 and the second sensor 24 are equal, and the level heights of the third sensor 25 and the fourth sensor 26 are equal. The projection of the first sensor 23 overlaps with that of the third sensor 25, and the projection of the second sensor 24 overlaps with that of the fourth sensor 26, but is not limited thereto.

The sliding component 22 is disposed in the chute SF, and is located on the lower point SFL of the chute SF if the body 21A does not swing. When the hydrostatic rotary mechanism 10A drives the body 21 to swing, the sliding component 22 is able to move in the chute SF. More, the level heights of the first sensor 23, the second sensor 24, the third sensor 25, and the fourth sensor 26 are raised and lowered followed by the oscillations of the hydrostatic rotary mechanism 10A.

As shown in FIG. 11, a flow control module 40A electrically connects with a signal processing module 30, which has a first pipeline P1, a second pipeline P2, a third pipeline P3, a fourth pipeline P4, a first valve V1, a second valve V2, a third valve V3, a fourth valve V4, and an oil return pipeline PR.

The oil return pipeline PR has an oil inlet end PR1 and an oil outlet end PR2. The oil outlet end PR2 of the oil return pipeline PR connects with a motor pump M and an oil tank B.

The two comparative ends of the first pipeline P1 connects with the first oil outlet hole H1 and the oil inlet end PR1 of the oil storage space 12 respectively, and the two comparative ends of the second pipeline P2 connects with the second oil outlet hole H2 and the oil inlet end PR1 of the oil storage space 12 individually. The two comparative ends of the third pipeline P3 connects with the third oil outlet hole H3 and the oil inlet end PR1 of the oil storage space 12 respectively, and the two comparative ends of the fourth pipeline P4 connects with the fourth oil outlet hole H4 and the oil inlet end PR1 of the oil storage space 12 individually.

The first valve V1 is disposed at the first pipeline P1, and the second valve V2 is disposed at the second pipeline P2. The third valve V3 is disposed at the third pipeline P3, and the fourth valve V4 is disposed at the fourth pipeline P4.

In accordance with FIG. 11 and FIG. 12, as the embodiment in FIG. 12, the first valve V1 and the second valve V2 are disposed at the bottom portion of the body 21A. The two opposite sides of the body 21A are disposed two connectors C1, C2 that connect with the first pipeline P1 and the second pipeline P2. A connector C3 connecting with the oil return pipeline PR is installed beneath the chute SF of the body 21A. Based on this, an integrated structure of the angle sensing module 20A and the flow control module 40A is provided.

With reference to FIG. 11, which explains the working principle of the multi-channel flow control system 100 of the present disclosure. When the hydrostatic rotary mechanism 10A is oscillating, the angle sensing module 20A senses the oscillation angle of the hydrostatic rotary mechanism 10 and generates sensing signals. The signal processing module 30A receives the sensing signals, and then provides control signals to the switching degrees of the first valve V1, and/or the second valve V2, and/or the third valve V3, and/or the fourth valve V4, in order to control the amount of the hydraulic oil LO flowing from the oil storage space 12 to the first pipeline P1, and/or the second pipeline P2, and/or the third pipeline P3, and/or the fourth pipeline P4 via the first oil outlet hole H1, and/or the second oil outlet hole H2, and/or the third oil outlet hole H3, and/or the fourth oil outlet hole H4, and thus to the oil return pipeline PR.

As shown in FIG. 4, for the hydrostatic rotary mechanism 10, taking the first rotary shaft C11 as a rotary center, the maximum oscillation angle range is between 90 and 95 degrees. The structures shown in FIG. 11 and FIG. 12 are suitable for a two-axis hydrostatic rotary mechanism that is with a more oscillation angle range.

Figure 13:
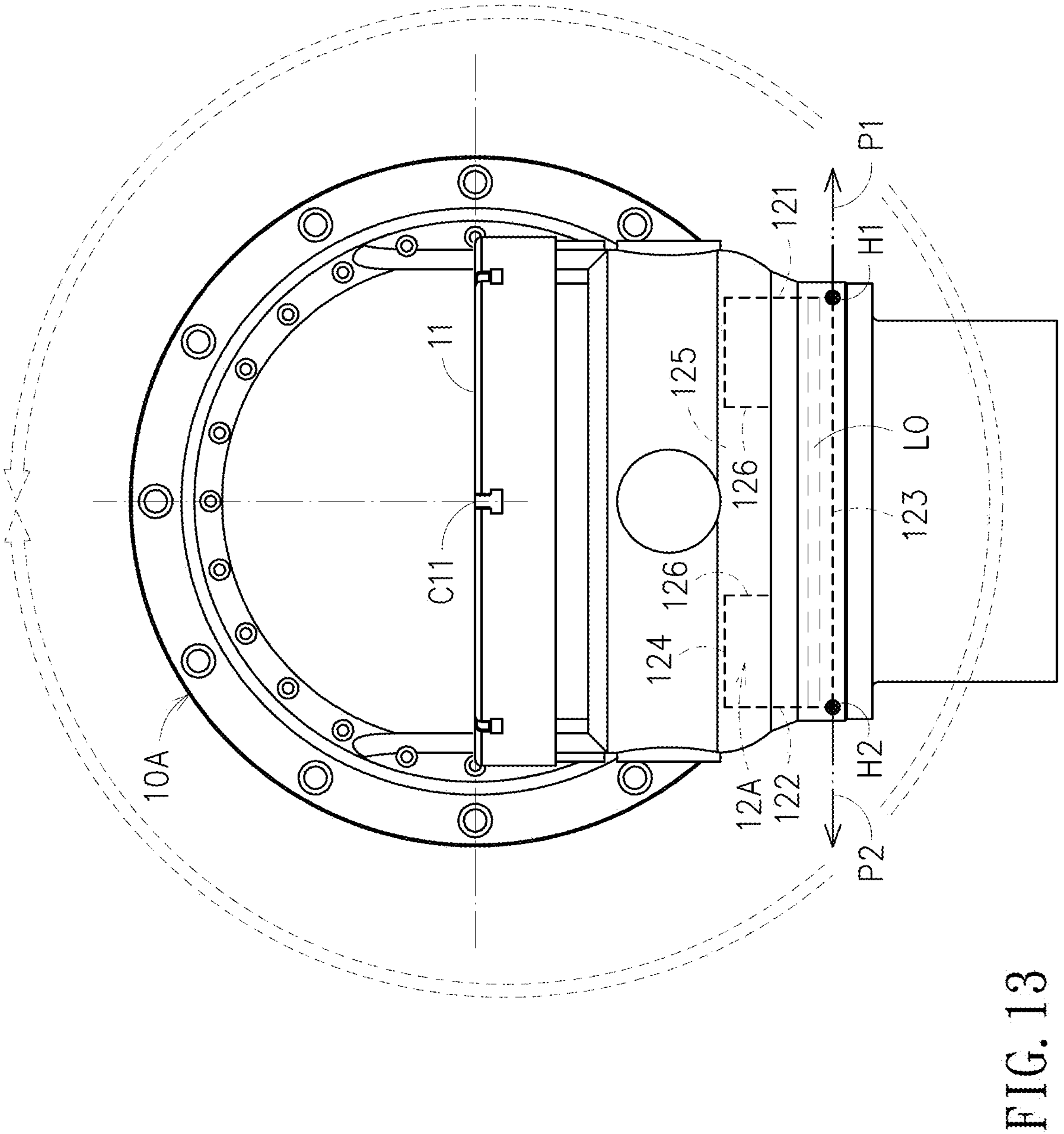
FIG. 13 illustrates a schematic front structural view of a two-axis hydrostatic rotary mechanism with a greater oscillation angle applied by the present disclosure; and FIG. 14A

Regarding the embodiment in FIG. 13, which illustrates a two-axis hydrostatic rotary mechanism to be as the hydrostatic rotary mechanism 10A. The hydrostatic rotary mechanism 10A has a worktable 11, and usually the oil storage space 12A is at the bottom portion of the worktable 11.

The oil storage space 12A has two opposite sides, a first side 121 and a second side 122. A third side 123 is between the two bottom edges of the first side 121 and the second side 122. A fourth side 124 is between the two top edges of the first side 121 and the second side 122.

The fourth side 124 of the oil storage space 12A has a through portion 125. The hydraulic oil LO is supplied to the oil storage space 12 from the worktable 11 via the through portion 125. A periphery of the through portion 125 is a barb-shaped structure.

Figure 14B:
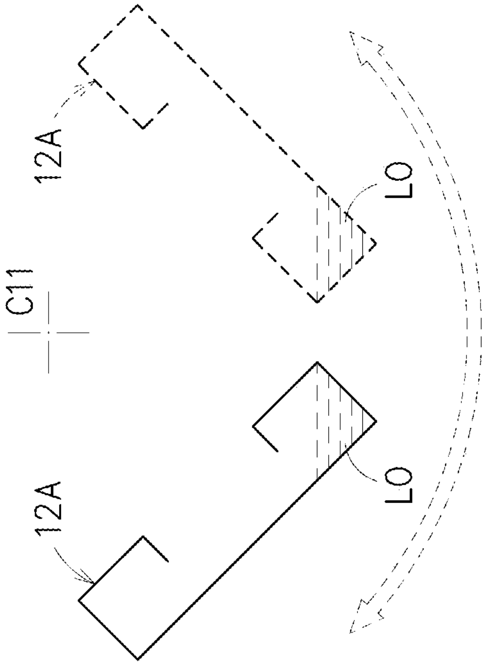
FIG. 14B illustrates a schematic view of changes in hydraulic oil of an oil storage space in different tilt angles of the two-axis hydrostatic rotary mechanism of FIG. 13.
Figure 14A:
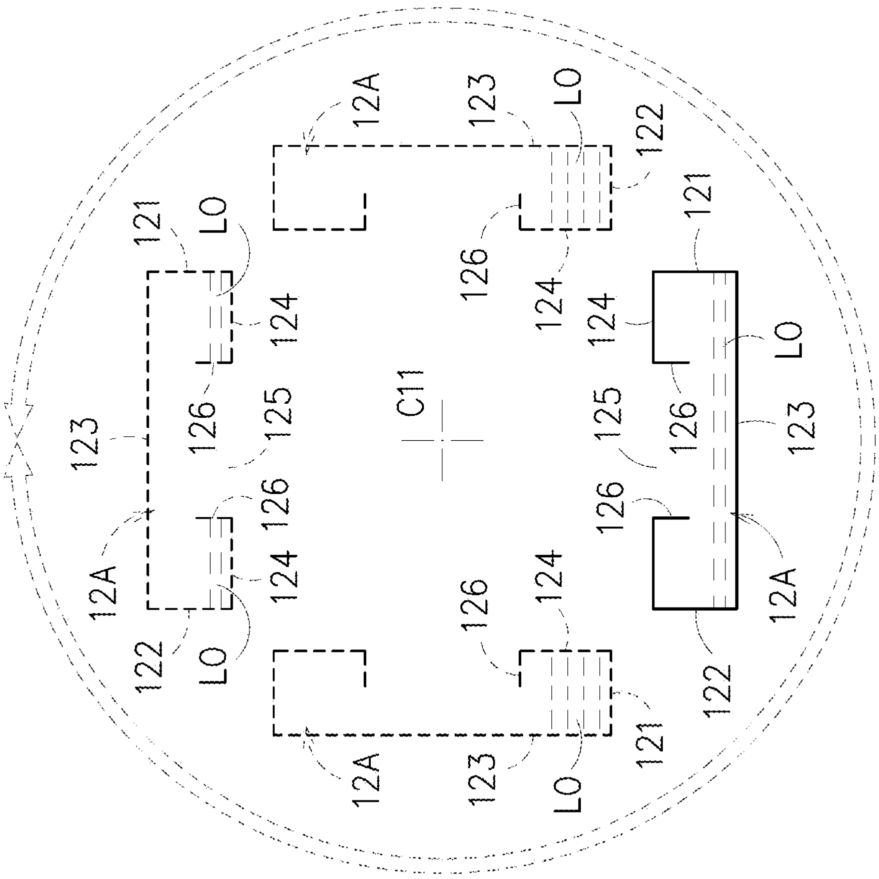

In accordance with FIG. 13 and FIG. 14A, taking the first rotary shaft C11 as a rotary center, the right angle and the left angle of the oscillations of the hydrostatic rotary mechanism 10A are about 180 degrees. The oil storage space 12A and the hydrostatic rotary mechanism 10A swing simultaneously.

In the case of the hydrostatic rotary mechanism 10A oscillating to 90 degrees toward right, the oil storage space 12A can be changed from a horizontal state to a vertical state. Thus, the hydraulic oil LO can accumulate in the space enclosed by the barb-shaped structure 126, the fourth side 124, the second side 122, and the third side 123.

In the other case of the hydrostatic rotary mechanism 10A oscillating to 180 degrees toward right and left, the oil storage space 12A can be flipped upside down. Thus, the hydraulic oil LO can accumulate in the space enclosed by the barb-shaped structure 126, the fourth side 124 and the first side 121, and the space enclosed by the barb-shaped structure 126, the fourth side 124, and the second side 122.

As shown in FIG. 13 and FIG. 14, the oscillation angles, toward right and left, of the oil storage space 12A are about 45 degrees. The state for the hydraulic oil LO appears that, the oil storage space 12 of the hydrostatic rotary mechanism 10 in FIG. 4 can be replaced by the oil storage space 12A in FIG. 14B.

In summary, the multi-channel flow control system provided in this disclosure configures plural forced oil return channels in the oil storage space of the hydrostatic rotary mechanism. Cooperated with plural angle sensors and valves, it controls the opening and closing of at least one forced oil return channel for different worktable tilt angles. Even when the tilt angle of the worktable changes in different directions, the oil return system can draw hydraulic oil back to the oil tank from the correct accumulation position. This prevents the oil pump from being damaged due to dry pumping, and ensures that the oil storage space does not over-accumulate hydraulic oil, thereby avoiding spillage from the worktable.

What is claimed is:

1. A multi-channel flow control system, applied to a hydrostatic rotary mechanism, which has an oil storage space for holding hydraulic oil, the oil storage space having a first side and a second side that are opposite to each other, the first side and the second side having at least one oil outlet hole respectively, the hydrostatic rotary mechanism being able to swing according to a first rotary shaft as a rotary center, a level height of each oil outlet hole at the first side and a level height of each oil outlet hole at the second side being raised and lowered together with the oil storage space that is driven by the hydrostatic rotary mechanism, comprising:

an angle sensing module, having a plurality of sensors, a part of components or total components of the angle sensing module and the hydrostatic rotary mechanism rotating simultaneously, in order to trigger off at least one of the sensors for generating a sensing signal;

a signal processing module, electrically connecting with the angle sensing module, receiving the sensing signals to generate a control signal; and a flow control module, having a plurality of pipelines, which connect with the oil outlet holes and an oil return pipeline respectively, each pipeline being disposed a valve individually, each of the valves electrically connecting with the signal processing module, the control signal controlling a switching degree of at least one of the valves, in order to control an amount of the hydraulic oil flowing into the oil return pipeline from the oil storage space via at least one of the oil outlet holes;

wherein the angle sensing module comprises:

a body, disposed at the hydrostatic rotary mechanism and oscillating with the hydrostatic rotary mechanism simultaneously, having a chute, the chute being with a lower point, two comparative sides of the lower point being a first portion and a second portion of the chute;

a sliding component, disposed in the chute, the sliding component being able to slide in the chute when the body is oscillating; and the plurality of sensors having a first sensor and a second sensor, the first sensor being disposed in the first portion, the second sensor being disposed in the second portion, two level heights of the first sensor and the second sensor being higher than a level height of the lower point, the two level heights of the first sensor and the second sensor being raised and lowered alternatively followed by that the body is oscillating.

2. The multi-channel flow control system according to claim 1, wherein between two bottom edges of the first side and the second side of the hydrostatic rotary mechanism is a third side, an adjacent place of the first side and the third side being disposed a first oil outlet hole, an adjacent place of the second side and the third side being disposed a second oil outlet hole, the hydrostatic rotary mechanism being able to swing according to the first rotary shaft as a rotary center, in order to let level heights of a first oil outlet hole and a second oil outlet hole be raised and lowered comparatively;

wherein the oil return pipeline has an oil inlet end and an oil outlet end;

wherein the plurality of pipelines has a first pipeline and a second pipeline, two comparative ends of the first pipeline connects with the first oil outlet hole and the oil inlet end respectively, and two comparative ends of the second pipeline connect with the second oil outlet hole and the oil inlet end individually; and wherein the plurality of valves has a first valve and a second valve, the first valve is disposed at the first pipeline, and the second valve is disposed at the second pipeline.

3. The multi-channel flow control system according to claim 1, wherein the chute is formed by one of the following group consisting of: at least one arc segment, a plurality of linear segments and at least one arc segment and at least one linear segment.

4. The multi-channel flow control system according to claim 3, wherein the chute is formed by the plurality of linear segments and has at least one turning point, the first sensor and the second sensor being disposed at two opposite ends of the chute, each of the turning points having a turning sensor.

5. The multi-channel flow control system according to claim 1, wherein the sliding component is selected from the group consisting of: a ball, a roller, and an object with a geometric shape characteristic of a rotary shaft, the sliding component being disposed in the chute, a shaft center of the rotary shaft being parallel to the first rotary shaft.

6. The multi-channel flow control system according to claim 1, wherein each of the sensors is selected from the group consisting of: a proximity switch, a photoelectric switch, a microswitch, and a wire.

7. The multi-channel flow control system according to claim 1, wherein the signal processing module is selected from the group consisting of: an embedded system, a micro-system, and a standard port.

8. The multi-channel flow control system according to claim 1, wherein each of the valves is selected from the group consisting of: a solenoid valve and a flow control valve.

9. The multi-channel flow control system according to claim 1, wherein the hydrostatic rotary mechanism is selected from the group consisting of: a worktable of a two-axis hydrostatic rotary machine tool and a spindle head of a two-axis hydrostatic system.

10. The multi-channel flow control system according to claim 2, wherein the oil storage space further has a fourth side, which is disposed between two top edges of the first side and the second side, the fourth side being opposite to the third side, an adjacent place of the first side and the fourth side being disposed a third oil outlet hole, an adjacent place of the second side and fourth side being disposed a fourth oil outlet hole, the level heights of the first oil outlet hole, the second oil outlet hole, the third oil outlet hole, and the fourth oil outlet hole being raised and lowered together with that when the hydrostatic rotary mechanism swings and drives the oil storage space to swing synchronously;

wherein the plurality of pipelines further has a third pipeline and a fourth pipeline, two opposite ends of the third pipeline connect with the third oil outlet hole and the oil inlet end respectively, two opposite ends of the fourth pipeline connect with the fourth oil outlet hole and the oil inlet end individually;

wherein the plurality of valves further has a third valve and a fourth valve, the third valve is disposed at the third pipeline, and the fourth valve is disposed at the fourth pipeline; and wherein the control signal further controls switching degree of the first valve, the second valve, the third valve, or the fourth valve in order to control an amount of the hydraulic oil flowing into the oil return pipeline from the oil storage space via the first oil outlet hole, the second oil outlet hole, the third oil outlet hole, or the fourth oil outlet hole.

11. The multi-channel flow control system according to claim 10, wherein the fourth side has a through portion, the hydraulic oil being supplied to the oil storage space via the through portion, a periphery of the through portion being a barb-shaped structure.

12. A multi-channel flow control system, applied to a hydrostatic rotary mechanism, which has an oil storage space for holding hydraulic oil, the oil storage space having a first side and a second side that are opposite to each other, the first side and the second side having at least one oil outlet hole respectively, the hydrostatic rotary mechanism being able to swing according to a first rotary shaft as a rotary center, a level height of each oil outlet hole at the first side and a level height of each oil outlet hole at the second side being raised and lowered together with the oil storage space that is driven by the hydrostatic rotary mechanism, comprising:

an angle sensing module, having at least one sensor, a part of components or total components of the angle sensing module and the hydrostatic rotary mechanism rotating simultaneously, in order to trigger off at least one of the sensors for generating a sensing signal;

a signal processing module, electrically connecting with the angle sensing module, receiving the sensing signals to generate a control signal; and a flow control module, having a plurality of pipelines, which connect with the oil outlet holes and an oil return pipeline respectively, each pipeline being disposed a valve individually, each of the valves electrically connecting with the signal processing module, the control signal controlling a switching degree of at least one of the valves, in order to control an amount of the hydraulic oil flowing into the oil return pipeline from the oil storage space via at least one of the oil outlet holes;

wherein between two bottom edges of the first side and the second side of the hydrostatic rotary mechanism is a third side, an adjacent place of the first side and the third side being disposed a first oil outlet hole, an adjacent place of the second side and the third side being disposed a second oil outlet hole, the hydrostatic rotary mechanism being able to swing according to the first rotary shaft as a rotary center, in order to let level heights of a first oil outlet hole and a second oil outlet hole be raised and lowered comparatively;

wherein the oil return pipeline has an oil inlet end and an oil outlet end;

wherein the plurality of pipelines has a first pipeline and a second pipeline, two comparative ends of the first pipeline connect with the first oil outlet hole and the oil inlet end respectively, and two comparative ends of the second pipeline connect with the second oil outlet hole and the oil inlet end individually;

wherein the plurality of valves has a first valve and a second valve, the first valve is disposed at the first pipeline, and the second valve is disposed at the second pipeline;

wherein the oil storage space further has a fourth side, which is disposed between two top edges of the first side and the second side, the fourth side being opposite to the third side, an adjacent place of the first side and the fourth side being disposed a third oil outlet hole, an adjacent place of the second side and fourth side being disposed a fourth oil outlet hole, the level heights of the first oil outlet hole, the second oil outlet hole, the third oil outlet hole, and the fourth oil outlet hole being raised and lowered together with that when the hydrostatic rotary mechanism swings and drives the oil storage space to swing synchronously;

wherein the plurality of pipelines further has a third pipeline and a fourth pipeline, two opposite ends of the third pipeline connect with the third oil outlet hole and the oil inlet end respectively, and two opposite ends of the fourth pipeline connect with the fourth oil outlet hole and the oil inlet end individually; and wherein the plurality of valves further has a third valve and a fourth valve, the third valve is disposed at the third pipeline, and the fourth valve is disposed at the fourth pipeline; and wherein the control signal controlling a switching degree of the first valve, the second valve, the third valve, or the fourth valve in order to control an amount of the hydraulic oil flowing into the oil return pipeline from the oil storage space via the first oil outlet hole, the second oil outlet hole, the third oil outlet hole, or the fourth oil outlet hole.

13. The multi-channel flow control system according to claim 12, wherein the fourth side has a through portion, the hydraulic oil being supplied to the oil storage space via the through portion, a periphery of the through portion being a barb-shaped structure.

* * * * *